US006686076B2

(12) United States Patent
Johnson (10) Patent No.: US 6,686,076 B2
(45) Date of Patent: Feb. 3, 2004

(54) ELECTROCHEMICAL CONVERSION SYSTEM

(75) Inventor: Lonnie G. Johnson, Atlanta, GA (US)

(73) Assignee: Excellatron Solid State, LLC, Atlanta, GA (US)

( * ) Notice: Subject to any disclaimer, the term of this patent is extended or adjusted under 35 U.S.C. 154(b) by 154 days.

(21) Appl. No.: 09/935,965

(22) Filed: Aug. 24, 2001

(65) Prior Publication Data

US 2002/0127441 A1 Sep. 12, 2002

Related U.S. Application Data

(63) Continuation-in-part of application No. 09/546,654, filed on Apr. 10, 2000.

(51) Int. Cl.[7] .................... H01M 14/00; H01M 10/50
(52) U.S. Cl. ................... 429/11; 429/47; 429/101; 429/120; 429/218.2; 136/205
(58) Field of Search ............... 429/11, 47, 57, 429/101, 120, 218.2; 136/205

(56) References Cited

U.S. PATENT DOCUMENTS

| | | | | |
|---|---|---|---|---|
| 4,040,410 A | | 8/1977 | Libowitz ............ 126/270 |
| 4,049,877 A | | 9/1977 | Saillant et al. ........... 429/11 |
| 4,098,958 A | | 7/1978 | Bettman ............... 429/17 |
| 4,422,500 A | | 12/1983 | Nishizaki et al. ...... 165/104.12 |
| 4,523,635 A | | 6/1985 | Nishizaki et al. ...... 165/104.12 |
| 4,562,511 A | | 12/1985 | Nishino et al. ........... 361/324 |
| 4,677,038 A | | 6/1987 | Salomon ............... 429/17 |
| 4,692,390 A | | 9/1987 | Roy et al. ............... 429/17 |
| 4,781,029 A | | 11/1988 | Ser Vaas .............. 60/641.7 |
| 4,818,638 A | | 4/1989 | Roy et al. ............... 429/20 |
| 5,087,534 A | * | 2/1992 | Ludwig ................ 429/11 |
| 5,139,895 A | | 8/1992 | Roy et al. ............... 429/17 |
| 5,336,573 A | | 8/1994 | Zuckerbrod et al. ...... 429/252 |
| 5,436,091 A | | 7/1995 | Shackle et al. ........... 429/192 |
| 5,498,489 A | | 3/1996 | Dasgupta ............... 424/152 |
| 5,540,741 A | | 7/1996 | Gozdz et al. ........... 29/623.5 |
| 5,547,782 A | | 8/1996 | Dasgupta et al. ........ 429/194 |
| 5,571,634 A | | 11/1996 | Gozdz et al. ........... 429/192 |
| 5,584,893 A | | 12/1996 | Mitchell .............. 29/623.5 |
| 5,588,971 A | | 12/1996 | Fauteux et al. ........ 29/623.5 |
| 5,591,544 A | | 1/1997 | Fauteux et al. ........ 429/209 |
| 5,597,659 A | | 1/1997 | Morigaki et al. ........ 429/190 |
| 5,778,515 A | | 7/1998 | Menon ................ 28/623.4 |
| 5,928,436 A | | 7/1999 | Borkowski et al. ...... 136/205 |

FOREIGN PATENT DOCUMENTS

| EP | 0 168 062 B1 | 12/1981 | |
|---|---|---|---|
| EP | 0 055 855 A2 | 7/1982 | |
| EP | 0 071 271 A2 | 2/1983 | |
| EP | 0 168 062 A2 | 1/1986 | |
| EP | 482091 | * 6/1995 | .......... H01M/14/00 |

OTHER PUBLICATIONS

Terry Cole, Science (vol. 221) Thermoelectric Energy Conversion with Solid Electroytes (Sep. 1983).
Heat Pumps Using Organometallic Liquid Absorbents, K. Thomas Feldman, Jr., Craig M. Jensen, Kwang J. Kim, Arsalan Razani (Date Unknown).
Oxidation Reduction Reactions (Date Unknown).

* cited by examiner

*Primary Examiner*—Stephen Kalafut
(74) *Attorney, Agent, or Firm*—Baker Donelson (57) ABSTRACT

An electrochemical conversion system (70) is disclosed having a housing divided by a hydrogen concentration cell (76) so as to define a first chamber (71) and a second chamber (72). A first mass of hydride material (84) is contained within the first chamber while a second mass of hydride material (85) is contained within the second chamber. The hydrogen concentration cell has a first gas diffusion electrode (20), a second gas diffusion electrode (21) and a proton conductive membrane (22) therebetween. The release of hydrogen from one of the masses of hydride material and its redox reaction creates an electrical potential across the cell. The housing first chamber (71) is tapered so that the housing easily pierces the ground upon impact from an elevated position.

20 Claims, 4 Drawing Sheets

ELECTROCHEMICAL CONVERSION SYSTEM

REFERENCE TO RELATED APPLICATION

This is a continuation in part of U.S. patent application Ser. No. 09/546,654 filed Apr. 10, 2000.

TECHNICAL FIELD

This invention relates to the conversion of heat energy into electrical energy utilizing a hydrogen electrochemical cell.

BACKGROUND OF THE INVENTION

The conversion of chemical energy to electrical energy may be accomplished in a variety of ways. It is known that electrochemical cells or batteries rely on redox reactions wherein electrons from reactant being oxidized are transferred to a reactant being reduced. With the separation of the reactants from each other, it is possible to cause the electrons to flow through an external circuit where they can be used to perform work.

Electrochemical cells however have had a problem related to the exhaustion of the reactants. Although most cells can be recharged by applying a reverse polarity voltage across the electrodes, such recharging requires a separate electrical source. During the recharging of the cell the cell typically is not utilized as an electrical power source, thus rendering it unusable during the recharging period.

Fuel cells have been developed in an effort to overcome problems associated with electrochemical cells. Typically, fuel cells operate by passing an ionized species across a selective electrolyte which blocks the passage of the non-ionized species. By placing porous electrodes on either side of the electrolyte, a current may be induced in an external circuit connecting the electrodes. The most common type of fuel cell is a hydrogen-oxygen fuel cell which passes hydrogen through one of the electrodes while oxygen is passed through the other electrode. The hydrogen and oxygen combine at the electrolyte-electrode interface to produce water. By continuously removing the water, a concentration gradient is maintained to induce the flow of hydrogen and oxygen to the cell.

These types of fuel cells however suffer from a number of disadvantages. These cells must be continuously supplied with a reactant in order to continuously produce electricity. Additionally, these cells produce a continuous product stream which continuously must be removed, the removal of which may pose a problem. The porous electrodes of these fuel cells must allow the passage of the reactant entering the cell. However, over time these porous electrodes can become fouled or plugged so as to slow or even prevent the passage of the reactant. Such slowing of the reactant flow reduces the production of electricity. Lastly, the selection of an appropriate electrolyte is not always easy. The electrolyte must rapidly transport the ionized species in order to increase the current production. Frequently, the limited migration of the ionized species through the electrolyte is a limiting factor on the amount of current produced.

In an effort to avoid the problems inherent with the previously described fuel cells, thermoelectric conversion cells have be designed. These thermoelectric conversion cells utilize heat to produce a pressure gradient to induce the flow of a reactant, such as molten sodium, across a solid electrolyte. A current is generated as sodium atoms lose electrons upon entering the electrolyte and gain electrons upon leaving the electrolyte. These cell however also suffer from the plugging of the porous electrodes required to pass the sodium ions. Furthermore, the diffusion of the sodium ions through the solid electrolytes has proven to be slow, thereby limiting the amount of current produced by the cell. Lastly, these types of fuel cells operate at extremely high temperatures, typically in a range between 1,200–1,500 degrees Kelvin, making them impractical for many uses.

Another problem associated with thermoelectric conversion cells has been their dependency upon an heat source to enable the operation of the cell. As such, these fuel cells have typically been rather large in size. Furthermore, the requirement of these cells to include a heat source has oftentimes prevented their use in remote area where it would be impractical to locate and operate such, or where it is undesirable to have one notice the physical presence of the cell.

Accordingly, it is seen that a need remains for an electrochemical conversion system that does not require a continuous source of reactant, which does not require an electrolyte which may become plugged over time, which may operate without notice, and which may be operated at relatively low temperatures. It is to the provision of such therefore that the present invention is primarily directed.

SUMMARY OF THE INVENTION

In a preferred form of the invention an electrochemical conversion system comprises a first mass of hydrogen absorbent material, a second mass of hydrogen absorbent material spaced from the fist mass of hydrogen absorbent material, a first electrode, a second electrode, a proton conductive membrane positioned between the first electrode and the second electrode, and a supply of hydrogen. The first electrode, second electrode and proton conductive membrane are operably positioned between the first mass of hydrogen absorbent material and the second mass of hydrogen absorbent material. The system also includes a housing containing the first mass of hydrogen absorbent material, the second mass of hydrogen absorbent material, the first electrode, the second electrode and the proton conductive membrane. The housing has a first portion containing the first mass of hydrogen absorbent material and a second portion containing the second mass of hydrogen absorben material. The housing first portion is configured to be implanted into the ground and to thermally transfer heat to and from the first mass of hydrogen absorbent material to the ground. With this construction, the first and second masses of hydrogen absorbent material are in fluid communication with each other through the first and second electrodes and through the proton conductive membrane and the hydrogen may be desorbed by one mass of hydrogen absorbent material and absorbed by the other mass of hydrogen absorbent material while passing through and reacting with the electrodes so as to cause an electric potential difference between the first and second electrodes.

DETAILED DESCRIPTION

Figure 1:
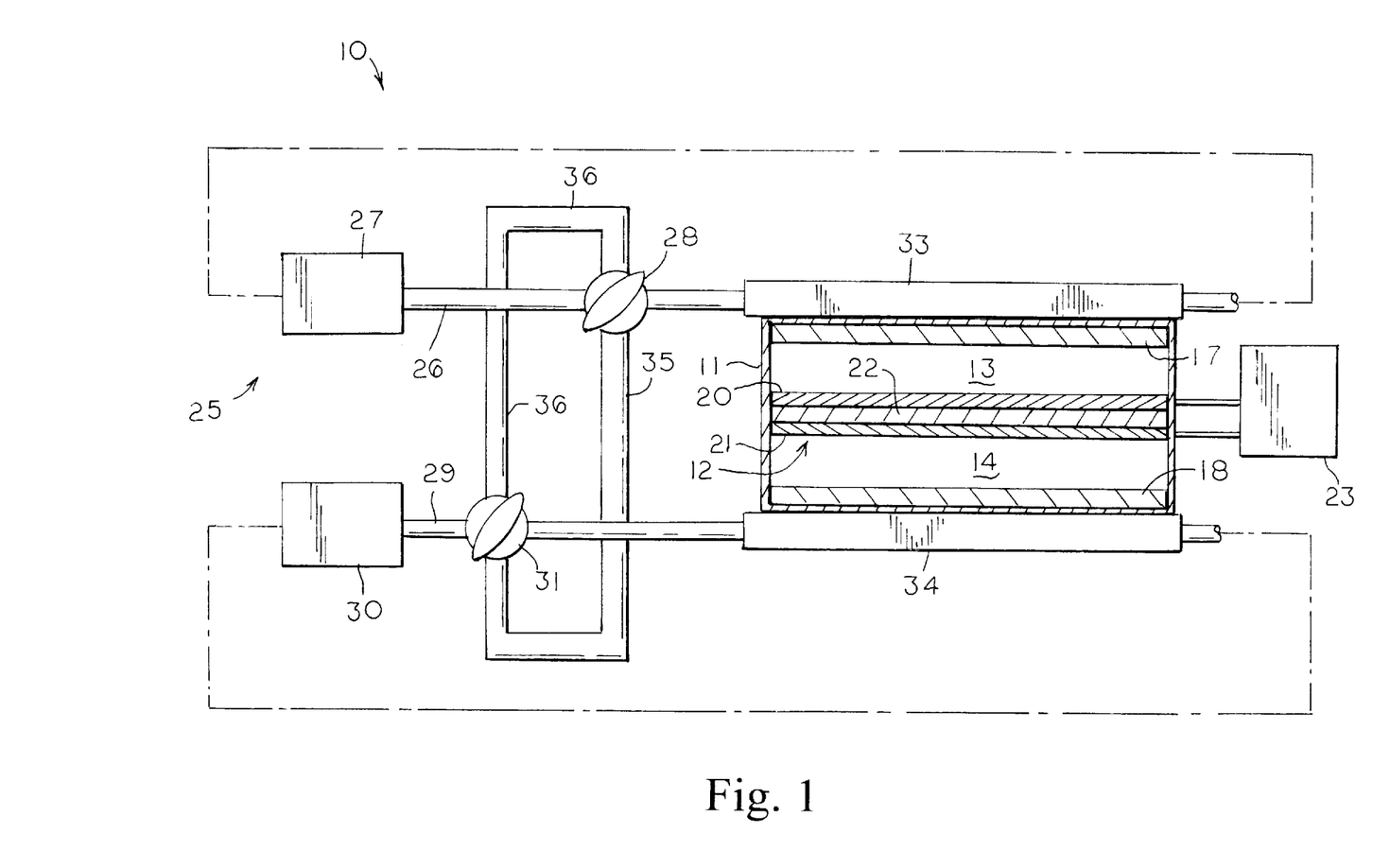
FIG. 1 is a schematic view of an electrochemical conversion system in a preferred form of the invention.

With reference next to the drawings, there is shown in FIG. 1 an electrochemical conversion system 10 in a preferred form of the invention. The system 10 has a housing 11 made of a non-reactive metal, such as stainless steel, in which is mounted an electrochemical or hydrogen concentration cell 12. The combination of the housing 11 and the concentration cell 12 define a first chamber 13 and a second chamber 14 separated from each other by the concentration cell 12. A first mass of hydride material 17, such as $LaNi_{4.7}Al_{0.3}$, $TiFe_{0.9}Mn_{0.1}$, liquid hydride, or other similar material, is contained within the first chamber 13. Similarly, a second mass of hydride material 18 is contained within the second chamber 14. For liquid hydride materials the terms hydride, metal hydride, hydrogen absorbent material and hydrogen absorbent metal material are equivalent.

The electrochemical cell 12 has a first gas diffusion electrode 20, a second gas diffusion electrode 21 and a proton conductive membrane 22, such as an perfluorinated polymer ionomer as for example Nafion made by $_{13}$E. I du Pont de Nemours, mounted between the first and second gas diffusion electrodes. This type of electrochemical cell 12 is available from E-Tek, Inc. of Somerset, N.J. The electrochemical cell electrodes 20 and 21 are electrically coupled to an external load or circuit 23.

The system 10 also includes all alternating heat transfer system 25 which selectively transfers heat to one mass of metal hydride material while absorbing heat from the other mass of metal hydride material. The heat transfer system 25 may utilize any form of heat source such as electric heaters, gas burning heaters, heated air, radiation heat sources, radiant heaters or other conventionally known means for producing heat. The heat transfer system 25 may also utilize any form of heat absorbing or dissipating means (heat sink), such as cooled fluids.

Here, the heat transfer system 25 has a network of conduits coupled to control valves which control the flow of the heated and cooled fluids passing through the conduit network. In more detail, the heat transfer system 25 has a heating input conduit 26 extending between a heating fluid source 27 and a first control valve 28, and a cooling input conduit 29 extending between a cooling fluid source 30 and a second control valve 31. The first control valve 28 is coupled to a first heat transfer manifold 33 positioned to transfer heat to and from the first mass of metal hydride material 17. Similarly, the second control valve 31 is coupled to a second heat transfer manifold 34 positioned to transfer heat to and from the second mass of metal hydride material 18. A first bridging conduit 35 extends between the first control valve 28 and the second control valve 31. A second bridging conduit 36 extends between the second control valve 31 and the first control valve 28.

The first control valve 28 is operable between a first position wherein fluid flowing through the heat input conduit 26 flows to the first heat transfer manifold 33 and a second position wherein the heated fluid flowing through the heat input conduit 26 flows through the first bridging conduit 35 to the second control valve 31. The second control valve 31 is operable between a first position wherein cooling fluid flowing through the cooling input conduit 29 flows to the second heat transfer manifold 34 and a second position wherein the cooling fluid flowing through the cooling input conduit 29 flows through the second bridging conduit 36 to the first control valve 28. With the first and second control valve 28 and 31 in their second positions, cooling fluid flowing into and through the second bridging conduit 36 continues into the first heat transfer manifold 33. Similarly, with the first and second control valves 28 and 31 in their second positions fluid flowing into and through the first bridging conduit 35 continuous into the second heat transfer manifold 34. In short, with the first and second control valves in their first positions the heated fluid from the heat input conduit 26 is conveyed into the first heat transfer manifold 33 while the cooling fluid from the cooling input conduit 29 is conveyed into the second heat transfer manifold 34. With the control valves repositioned to their second positions the flows of the fluids are alternated so that the heated fluid flowing from the heat input conduit 26 is now conveyed to the second heat transfer manifold 34 and the cooling fluid flowing from the cooling input conduit 29 is now conveyed to the first heat transfer manifold 33.

In use, the control valves 28 and 31 are positioned in their first position so that a heated fluid passing through the heat input conduit 26 is directed into the first heat transfer manifold while a cooling fluid passing through the cooling input conduit 29 is directed into the second heat transfer manifold 34. The heated fluid within the first heat transfer manifold 33 heats the first mass of metal hydride material 17 within the first chamber 13. The heating of the metal hydride material causes the metal hydride material to release hydrogen gas into the first chamber 13, thereby causing a pressure increase within the first chamber 13. Conversely, the cooling fluid within the second heat transfer manifold 34 cools the second mass of metal hydride material 18 within the second chamber 14. The cooling of the metal hydride material causes it to absorb any hydrogen gas within the second chamber 14, thereby causing a pressure decrease within the second chamber.

As the pressure differential between the first and second chambers 13 and 14 increases an electrical potential across the cell is created and progressively increased, for as a current is passed through the external load 23 hydrogen gas at the higher pressure first chamber adjacent the first electrode 20 is oxidized into protons. These protons are conducted through the proton conductive membrane 22 to the second electrode 21 at the lower pressure second chamber 14, where it is reduced into hydrogen gas and spontaneously absorbed by the second mass of metal hydride material 18. The oxidation of the hydrogen gas causes the release of electrons which are then passed to the first electrode while the reduction of protons into hydrogen gas causes the acceptance or receiving of electrons from the second electrode, thereby inducing a current. The absorption of the hydrogen by the second mass maintains the second chamber 14 at a low pressure state. The second mass continues to absorb hydrogen gas until the metal hydride material approaches its saturation point. The net result is that the high pressure hydrogen gas is transferred from the first chamber 13 to the second chamber 14 through the electrochemical cell 12 until hydrogen gas in chamber 13 is depleted or the circuit 23 is turned off.

Once the first mass of metal hydride material 17 has released its associated hydrogen and the second mass of metal hydride material 18 has become substantially saturated with hydrogen, i.e. an equilibrium is reached, the heat transfer process is reversed. The heat transfer process is reversed by actuating the first and second control valves 28 and 31 to their second positions. Thus, the heating fluid flowing from the heat input conduit 26 is directed into the first bridging conduit 35 so as to flow to the second control valve 31 which then directs the heating fluid into the second heat transfer manifold 34. Similarly, the cooling fluid flowing from the cooling input conduit 29 is directed into the second bridging conduit 36 so as to flow to the first control valve 28 which then directs the cooling fluid into the first heat transfer manifold 33. As such, the second mass of metal hydride material 18 is now heated so as to release the hydrogen gas into the second chamber 14 thereby increasing the pressure therein. Conversely, the first mass of metal hydride material 17 is now cooled thereby causing it to absorb hydrogen gas and thereby decrease the pressure within the first chamber 13. The pressure differential between the first and second chambers once again causes the hydrogen gas to pass through the electrochemical cell, albeit now in the opposite direction, thereby creating electricity as previously described.

The transfer of hydrogen across the electrochemical cell creates an energy (work) in the form of electrical energy through the external load. The voltage across the electrochemical cell may be calculated by utilizing the following equation:

$$E=(RT/2F)(lN)(P_h/P_l)$$

where R is the gas constant, T is the cell temperature, F is Faraday constant, and it is assumed that the temperature across the electrochemical cell is uniform. With this formula it can be calculated that the open circuit voltage for a single cell is 59.2 mV and that the electrical energy the concentration cell can provide is approximately 11.4 kJ for transferring one mole of hydrogen gas through the cell at 25 C. if the pressure ratio between the first and second chambers is 100:1. To generate a hydrogen pressure ratio, the temperature difference required between the heat source and the heat sink can be estimated utilizing the following equation:

$$\Delta T=T_l((RT_l ln(P_h/P_l))/(-\Delta H))/1+((RT_l ln(P_h/P_l))/\Delta H) \ P_h/P_l)/\Delta H)$$

where $\Delta H$ is the hydrogen desorption enthalpy. In deriving this equation, a linear relationship between logarithm of hydrogen pressure and the reciprocal of temperature is used. Thus, assuming that the heat sink temperature is 25 C. and the hydrogen desorption enthalpy is equal to −30 kJ/mol, the temperature difference required for generating a pressure ratio of 100:1 can be estimated to be 183 C. Accordingly, it can be understood that the hydrogen pressure can be greatly increased by a relatively low heating of the metal hydride material.

It should be understood that except for minor issues due to gas diffusion, the hydrogen gas cannot penetrate through the electrochemical cell at open circuit. However, when the electrochemical cell is under load hydrogen gas is oxidized and conducted through the membrane as protons where it is then reduced back to hydrogen gas, thereby providing an electric potential energy to the external load.

Figure 2:
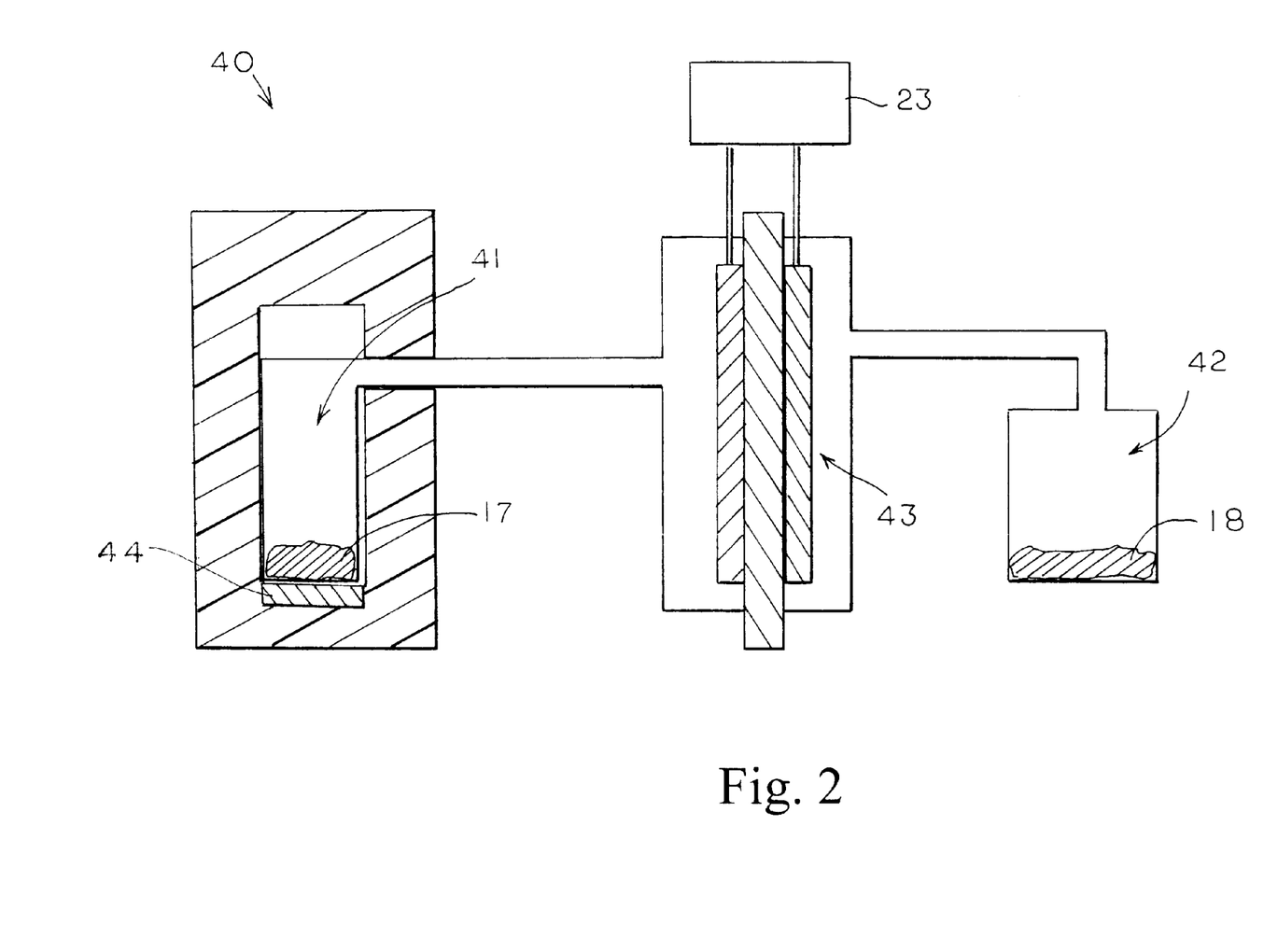
FIG. 2 is a schematic view of an electrochemical conversion system in another preferred form of the invention.

With reference next to FIG. 2, there is shown an electrochemical conversion system 40 in another preferred form of the invention. The system 40 has a first chamber 41 thermally insulated from ambience and includes heat sink/source material 44, a second chamber 42 exposed to ambience, and an electrochemical cell 43 therebetween. This system may be utilized within a home to convert ambient heat to electricity or to utilized heat released by or absorbed by the reacting metal hydrides. As such, the heating and cooling means is provided by the environment.

In use, during the heat of the day the second chamber 42 is exposed to ambient heat while the insulated, first chamber 41 remains cool. The heating of the second chamber while the first chamber remains cool causes the release of hydrogen within the second chamber so as to create a pressure differential. The release of hydrogen increases the pressure within the second chamber. The pressure differential between the first and second chambers causes the hydrogen to pass from the second chamber to the first chamber through the electrochemical cell 43, thereby creating electricity as previously described. The absorption of hydrogen in the metal hydride of the first chamber elevates its temperature to that of the second chamber. Equilibrium is eventually achieved between the two chambers at which time hydrogen transfer and the associated current flow stops. As the day turns to night, the ambient temperature assumably drops below that of the insulated first chamber 41. The temperature difference, and thereby the pressure difference, causes the hydrogen gas within the first chamber's metal hydride material to be released, thereby increasing the pressure within the first chamber. This pressure difference causes the hydrogen to pass from the first chamber 41 to the second chamber 42, i.e. reversing the process. Heat sink/source material 44 (water, parafin phase change material, or other high heat capacity material) is included in the first chamber to absorb heat from the metal hydride during the exothermic hydrogen absorption process. This helps to thermally stabilize the hydride allowing it to absorb more hydrogen than it otherwise would be able to without the material 44. Similarly material 44 acts as a heat source when hydrogen is being released from the hydride in chamber 41 to support the indothermic desorption process. The amount of hydrogen that can be absorbed or desorbed during a given cycle has a direct relationship with the amount of heat that can be stored and released by material 44.

Figure 3:
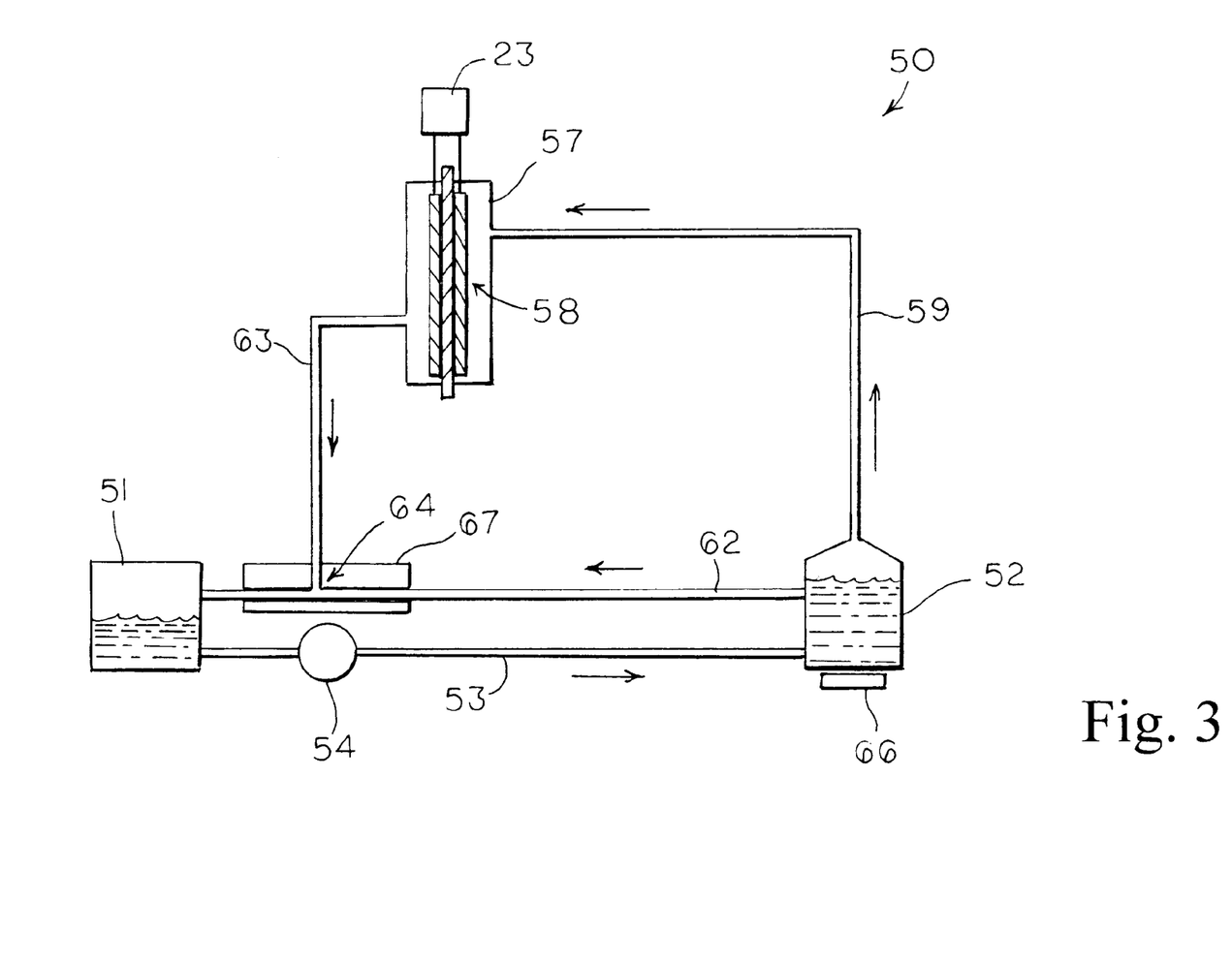
FIG. 3 is a schematic view of an electrochemical conversion system in another preferred form of the invention.

Referring next to FIG. 3, there is shown an electrochemical conversion system 50 in yet another preferred form of the invention. The system 50 has a first chamber 51 and a second chamber 52 in fluid communication with each other through a transfer conduit 53 having a liquid pump 54 which pumps liquid from the first chamber 51 to the second chamber 52. The system 50 also has a reaction chamber 57, containing an electrochemical conversion cell 58, in fluid communication with the second chamber 52 through a first gas conduit 59. The system also has a liquid conduit 62 extending from the second chamber 52 to the first chamber 51 and a second gas conduit 63 extending from the reaction chamber 57 to a junction 64 in the liquid conduit 62. A heating source 66 is positioned to transfer heat to the second chamber 52 while a cooling source or heat exchanger 67 is coupled to remove heat at the junction 64 of the liquid conduit 62 and second gas conduit 63, or thereafter within the first chamber. A supply of hydrogen gas concentrated hydride liquid is contained within the system 50. The hydride liquid may be HySorb organometallic liquid such as organometallic dihydrogen complexes containing dihydrogen ligands a specific example of which is cyclopentadienyl dihydrogen.

In use, the liquid hydride within the second chamber 52 is heated by the heat source 66 to a temperature to cause the release of hydrogen gas from the liquid hydride. The hydrogen gas passes through the first gas conduit 59 and into the reaction chamber 57 wherein the pressure differential therein causes the hydrogen gas to pass through the conversion cell 58 to create electricity as previously described. The hydrogen gas then continues through the second gas conduit 63 to the junction 64. Simultaneously, the hydrogen depleted liquid passes from the second chamber 52 through the liquid conduit 62 and through the junction 64 whereby the cooling source 67 extracts the heat from the hydrogen depleted liquid and hydrogen gas so that the hydrogen gas mixing with the liquid at the junction recombines with the liquid to form a hydride liquid. The recombined hydride liquid and any remaining hydrogen gas and hydrogen depleted liquid passes into the first chamber 51 wherein the remaining hydrogen depleted liquid may continue to recombine with the remaining hydrogen gas. The hydride liquid may then be pumped through the transfer conduit 53, by the liquid pump 54, into the second chamber 52 wherein it may be cycled through the system again. It should be noted that the system may be used continuously or in batched sequence.

Figure 4:
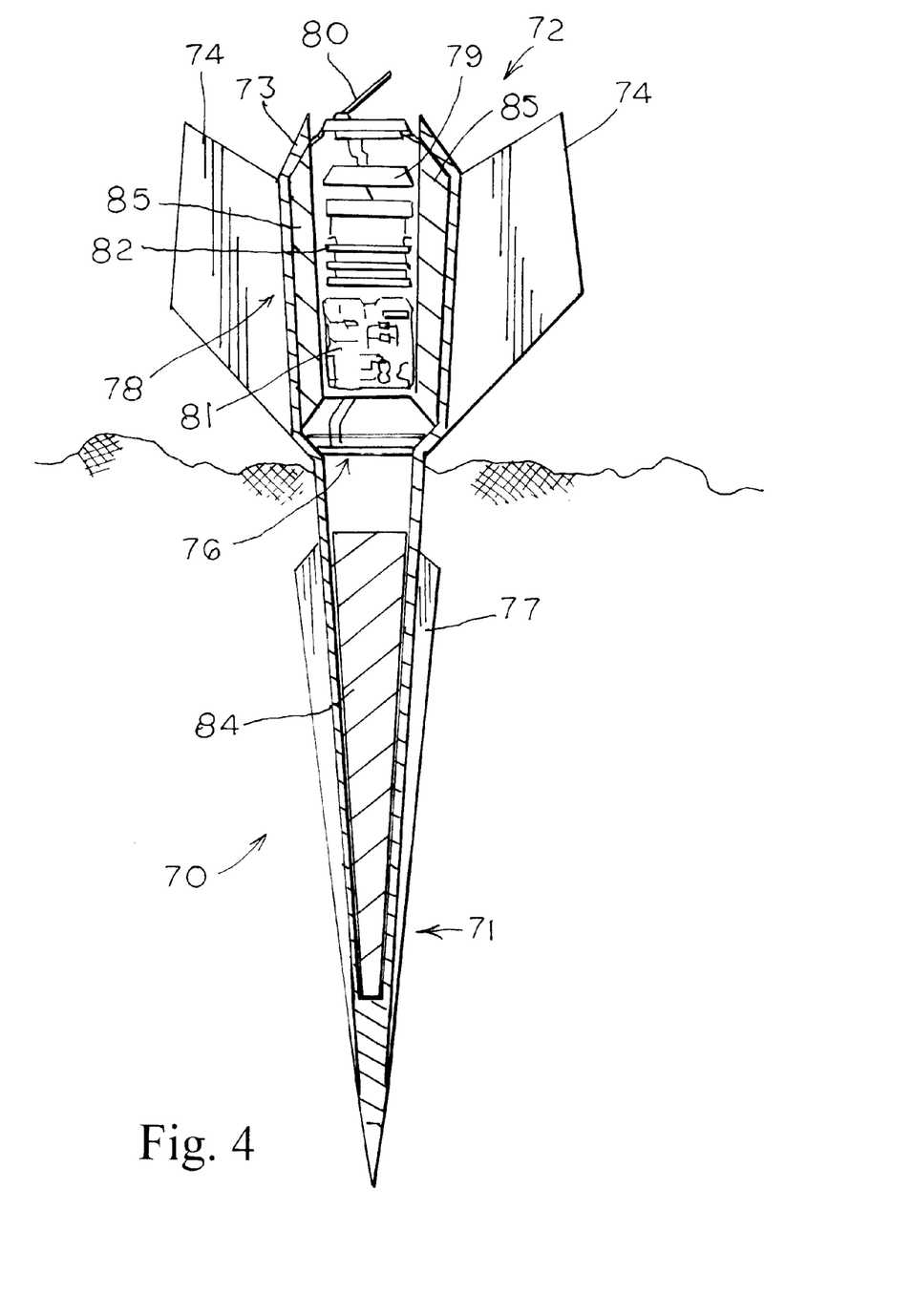
FIG. 4 is a schematic, partial cross-sectional side view of an electrochemical conversion system is yet another preferred form of the invention.

With reference next to FIG. 4, there is shown an electrochemical conversion system 70 in another preferred form of the invention. The system 70 has a housing in the form of a missile having a tapered first, forward portion or chamber 71 and a second portion or chamber 72 extending from the first portion 71. The first portion 71 includes a nose cone or probe and forward fuselage, while the second portion 72 forms a rearward fuselage 73 and an annular array of heat transferring fins 74, and a previously described electrochemical cell 76 therebetween which is positioned within the housing. The first portion 71 also has an annular array of heat transferring aerodynamic fins 77. The electrochemical cell 76 is shown electrically coupled to electronics 78 which include a sensor 79, a transmitting antenna 80, an operating circuitry 81 and a power storage means 82 such as a battery or capacitor. It should be understood that any electronic device may be used in conjuction with the electrochemical cell 76.

Here, the system 70 has a first mass of metal hydride material 84 positioned within the first portion 71 in thermal communication with the housing first portion 71 and a second mass of metal hydride material 85 positioned within and in thermal communication with the housing second portion 72.

This system is designed to be dropped from an elevated position so that the inertia of the system causes the housing first portion 71 to be buried into the ground upon impact with the second portion 72 remaining exposed to ambience. During operation, this system 70 converts ambient heat to electricity through the heat released by or absorbed by the reacting metal hydrides. As such, the heating and cooling means is provided by the environment.

In use with the first portion 71 buried within the ground, during the heat of the day the second chamber 72 is exposed to ambient heat while the first chamber 71 is maintained at a near constant cooler temperature within the ground. The heating of the second chamber 72 and the cooler temperature of the first chamber 71 causes the release of hydrogen from the second mass of material 85 within the second chamber 72 so as to create a pressure differential. The pressure differential between the first and second chambers causes the hydrogen to pass from the second chamber 72 to the first chamber 71 through the electrochemical cell 76, thereby creating electricity as previously described. This electricity may be utilized to power the electronics 78 or may be stored within the power storage means 82 for later use. As the day turns to night, the ambient temperature assumably drops and the ground eventually warms over the course of the day so that the temperature of the ground is warmer than that of ambiance and the first chamber 71. The temperature difference, and thereby the pressure difference, causes the hydrogen gas within the first mass of material 84 within the first chamber to be released, thereby increasing the pressure within the first chamber 71. This pressure difference causes the hydrogen to pass back from the first chamber 71 to the second chamber 72, i.e. reversing the direction of the process while still creating electricity.

It should be understood that the housing fins 74 and 77 of both the first and second chambers provide for a more efficient transfer of heat between the surrounding environment and the contained metal hydride materials. It should also be understood that the invention is not limited to systems being implanted in the ground upon impact from an elevated position, and that the system may also be in the form of a device having a first portion configured to be manually driven into the ground, as with the use of one's foot. It should also be understood that the system may also incorporate the physical movement of the mass of material as previously described.

The just described embodiment allows the conversion system with electronics to be dropped from an airplane or other craft in remote locations without the need for mechanical heat sources. As such, these electronics may include sensors which provide remote monitoring. As electricity is produced continually these devices provide the sensors with the ability to continually or intermittingly monitor without being restricted by the energy available by a single source such as a battery which has a limited lifetime. Obviously, the electricity produced by the system establishes certain parameters with regard to the electronics or the storage necessary to operate the electronics.

With regard to the previous embodiments, it should be understood that the invention may employ other methods of alternating the transfer of the heating and cooling mediums, such as alternating the position of the previously described alternative heating and cooling means. For example, the ignition of gas burners positioned adjacent the first and second chambers may be alternated back and forth. Furthermore, it should be understood that alternatively the heating and cooling means may be maintained stationary while the housing is reciprocated to alternate the relative positions of the first and second chambers. As such, the repositioning or reciprocating of the heat transfer means is equivalent to the repositioning of the chambers relative to the heat transfer means.

With regard to all shown embodiments, it should also be understood that the system may utilize several electrochemical cells aligned parallel to each other so that the hydrogen gas passes through each cell in succession. Several electrochemical cells may also be positioned upon one membrane and connected in series or in parallel to each other.

It should also be understood that the heating of the metal hydride material provides for a much greater fluctuation in gas pressure within the chambers than the heating of gas alone. For it should be noted that the desorption enthalpy is very large for these materials, typically in the order of −30 kJ/mole. As such, a temperature change of merely 150° C. may change the pressure by two orders (100). For example, the hydrogen pressure equilibrium with the metal hydride may increase from 0.42 atm to 42 atm with a temperature change from 25 C. to 175 C. Comparably, a temperature change of 150 C. for hydrogen gas merely increases the gas pressure from 0.42 atm to 0.60, an increase of only 42%. As such, it can be seen that utilizing metal hydride is an effective means of converting thermal energy (related to temperature) to mechanical energy (related to pressure) through a pressure differential. Furthermore, this system converts energy without any mechanically moving part except for the control valves.

Lastly, it should be understood that by controlling the passage of the electrical current one may control the flow of the hydrogen across the electrochemical cell. As such, the rate of heat removed from the high temperature side can be controlled precisely based on the hydrogen desorption enthalpy and the hydrogen flow rate. It should be noted that when a metal hydride releases hydrogen it absorbs heat from its environment, i.e. an endothermic reaction, while the adsorption of hydrogen gas causes the release of heat to its environment, i.e. an exothermic reaction. Consequently, the temperature at the heat source side can be controlled in this manner for refrigeration purposes.

It thus is seen that an electrochemical conversion system is now provided which is efficient, which may be operated at relatively low temperatures and which may be deployed for operation in remote locations. It should of course be understood that many modifications, in addition to those specifically recited herein, may be made to the specific preferred embodiments describe herein without departure from the spirit and scope of the invention as set forth in the following claims.

What is claimed is:

1. An electrochemical conversion system comprising:
   a first mass of hydrogen absorbent material;
   a second mass of hydrogen absorbent material spaced from said first mass of hydrogen absorbent material;
   a first electrode;
   a second electrode;
   a proton conductive membrane positioned between said first electrode and said second electrode,
   said first electrode, second electrode and said proton conductive membrane being operably between said first mass of hydrogen absorbent material and said second mass of hydrogen absorbent material;
   a housing containing said first mass of hydrogen absorbent material, said second mass of hydrogen absorbent material, said first electrode, said second electrode and said proton conductive membrane, said housing having a first portion containing said first mass of hydrogen absorbent material and being configured to be implanted into the ground and to thermally transfer heat from said first mass of hydrogen absorbent material to the ground, said housing also having a second portion containing said second mass of hydrogen absorbent material; and
   a supply of hydrogen,
   whereby the first and second masses of hydrogen absorbent material are in fluid communication with each other through the first and second electrodes and through the proton conductive membrane and whereby the hydrogen may be desorbed by one mass of hydrogen absorbent material and absorbed by the other mass of hydrogen absorbent material while passing past and reacting with the electrodes and the proton conductive membrane so as to cause an electric potential difference between the first and second electrodes.

2. The electrochemical conversion system of claim 1 wherein said housing first portion includes heat transferring fins.

3. The electrochemical conversion system of claim 1 wherein said housing second portion includes heat transferring fins.

4. The electrochemical conversion system of claim 2 wherein said housing second portion includes heat transferring fins.

5. The electrochemical conversion system of claim 1 wherein said first and second masses of hydrogen absorbent material are comprised of hydrogen absorbent metal material.

6. The electrochemical conversion system of claim 1 wherein said housing first portion is tapered and wherein the entire housing has an aerodynamic form such that the housing first portion becomes oriented downwardly as the electrochemical conversion system free falls from an elevated position, whereby the housing first portion impales itself into the ground when dropped from an elevated position.

7. An electrochemical conversion system comprising:
   a housing having a first chamber and a second chamber, said first chamber being tapered so that the first chamber may be driven into the ground while leaving the majority of the second chamber exposed to ambience;
   an electrochemical cell mounted within said housing so as to separate said first chamber within said housing from said second chamber within said housing;
   a first mass of hydrogen absorbent material positioned within said first chamber;
   a second mass of hydrogen absorbent material position within said second chamber; and
   a supply of hydrogen absorbable and desorbable by said first and second masses of hydrogen absorbent material;
   whereby the first chamber may be implanted into the ground to provide a generally stable temperature environment while the second chamber is exposed to ambience so that the temperature of the second mass of hydrogen absorbent material fluctuates over time to a temperature both cooler than the first mass and a temperature warmer than the first mass.

8. The electrochemical conversion system of claim 7 wherein said electrochemical cell includes a first electrode, a second electrode and a proton conductive membrane positioned between said first electrode and said second electrode.

9. The electrochemical conversion system of claim 7 wherein said hydrogen absorbent material is comprised of a hydrogen absorbent metal material.

10. The electrochemical conversion system of claim 7 wherein said housing first chamber includes heat transferring fins.

11. The electrochemical conversion system of claim 7 wherein said housing second chamber includes heat transferring fins.

12. The electrochemical conversion system of claim 10 wherein said housing second chamber includes heat transferring, fins.

13. The electrochemical conversion system of claim 7 wherein said first and second masses of hydrogen absorbent material are comprised of hydrogen absorbent metal material.

14. The electrochemical conversion system of claim 7 wherein said housing first chamber is tapered and wherein the entire housing has an aerodynamic form such that the housing first chamber becomes oriented downwardly as the electrochemical conversion system free falls from an elevated position, whereby the housing first chamber impales itself into the ground when dropped from an elevated position.

15. A method of producing electricity comprising the steps of,
   driving a housing first portion into the ground containing a first mass of hydrogen absorbent material while exposing a housing second portion to ambience containing a second mass of hydrogen absorbent material,
   flowing hydrogen from one mass of hydrogen absorbent material to the other mass of hydrogen absorbent material and through an electric conversion cell having two spaced apart electrodes and a proton conductive membrane positioned between the electrodes which selectively passes hydrogen protons therethrough, the hydrogen protons being produced from the oxidation of hydrogen gas passing past one of the electrodes, the hydrogen flow being induced by a temperature differential between the masses of hydrogen absorbent materials created by the temperature differential between the fist housing portion and the second housing portion, and therefore a pressure differential across the cell resulting from the release of hydrogen from a mass of hydrogen absorbent material, whereby an electric current is induced through a load coupled to the electrodes.

16. The method of claim 15 wherein the first housing portion is implanted by dropping the housing from an elevated position.

17. The method of claim 15 wherein said hydrogen absorbent material is a metal hydride material.

18. A method of producing electricity, said method comprising the steps of:
(a) forcing a first housing in the ground containing a metal hydride;
(b) thermally decomposing and separating a metal hydride at a first temperature to produce hydrogen gas and a metal;
(c) directing the hydrogen gas to a first electrode of a conversion cell having two spaced apart electrodes and a proton conductive membrane positioned between the electrodes;
(d) oxidizing the hydrogen gas to produce hydrogen protons; and
(e) passing the hydrogen protons through the proton conductive membrane and adjacent the second electrode so as to cause the hydrogen protons to reduce back to hydrogen gas thereby providing an electric energy to an external circuit across the first and second electrodes.

19. The method of claim 18 further comprising the step of (f) reacting the hydrogen gas passed through the conversion cell with the metal to reform the metal hydride.

20. The method of claim 18 wherein step (a) the housing is implanted in the ground by dropping the housing from an elevated position so that the housing pierces the ground upon impact.

* * * * *